United States Patent
Dewaele

(10) Patent No.: US 6,353,674 B1
(45) Date of Patent: Mar. 5, 2002

(54) METHOD OF SEGMENTING A RADIATION IMAGE INTO DIRECT EXPOSURE AREA AND DIAGNOSTICALLY RELEVANT AREA

(75) Inventor: Piet Dewaele, Berchem (BE)

(73) Assignee: Agfa-Gevaert, Mortsel (BE)

(*) Notice: Subject to any disclaimer, the term of this patent is extended or adjusted under 35 U.S.C. 154(b) by 0 days.

(21) Appl. No.: 09/089,598

(22) Filed: Jun. 2, 1998

Related U.S. Application Data

(60) Provisional application No. 60/052,670, filed on Jul. 16, 1997.

(30) Foreign Application Priority Data

Jun. 5, 1997 (EP) .............................. 97201683

(51) Int. Cl.$^7$ ................................. G06K 9/00
(52) U.S. Cl. ...................... 382/132; 382/168
(58) Field of Search ................. 382/128, 131, 382/132, 133, 168, 169, 170, 171, 172, 173, 237, 254, 266, 270, 272, 274, 130; 395/131; 250/587; 364/413.13; 128/653.2; 378/4, 62; 345/431, 589

(56) References Cited

U.S. PATENT DOCUMENTS

| | | | |
|---|---|---|---|
| 5,060,290 A | 10/1991 | Kelly et al. | 382/18 |
| 5,268,967 A | * 12/1993 | Jang et al. | 382/132 |
| 5,594,807 A | 1/1997 | Liu | 382/128 |
| 5,926,564 A | * 7/1999 | Kimura | 382/170 |
| 5,974,165 A | * 10/1999 | Giger et al. | 382/132 |

OTHER PUBLICATIONS

"An Automated Thresholding Approach for Segmenting Deteriorated SEM Images in X–Ray Mask Visual Inspection" by Minoru Ito (XP 000595188); EIECE Trans. Inf. &Syst. vol. E79–D, No. 6, Jun. 1, 1996, pp. 866–872.

"Indexing Via Color Histograms" by Swain et al.; Proceedings of the International Conference on Computer Vision, Osaka, Dec. 4–7, 1990; IEEE Computer Society, pp. 390–393 (XP000242625).

\* cited by examiner

*Primary Examiner*—Samir Ahmed
(74) *Attorney, Agent, or Firm*—Hoffman, Warnick & D'Alessandro LLC; John A. Merecki

(57) ABSTRACT

In a method of segmenting an image represented by a digital signal representation into direct exposure area and diagnostically relevant area, the local centroids of the histogram of the image are calculated. A set of archetype histograms with associated threshold value is generated. An archetype histogram is selected on the basis of correspondence of location and strength of its local centroids with that of the calculated local centroids. The threshold value associated with the selected archetype histogram is applied to the image so as to form a bitmap image comprising a different label for pixels of direct exposure area and for pixels of diagnostically relevant area.

12 Claims, 12 Drawing Sheets

METHOD OF SEGMENTING A RADIATION IMAGE INTO DIRECT EXPOSURE AREA AND DIAGNOSTICALLY RELEVANT AREA

This application claims the benefit of U.S. Provisional Application No. 60/052,670 filed Jul. 16, 1997.

FIELD OF THE INVENTION

This invention relates to digital image processing. More specifically, the invention relates to a method for segmenting a radiation image such as an x-ray image into diagnostic areas (or body parts) and direct exposure areas (background area).

BACKGROUND OF THE INVENTION

In radiation imaging systems such as computed radiography systems, it is now common practice to apply signal processing to the digital signal representation of an image so as to generate an enhanced image. In this way the radiologist is aided in better perceiving even the subtlest diagnostic details in the image.

This image enhancement is for example achieved by a multiscale contrast enhancement, suitable window/level setting and sensitometric mapping etc.

A great number of image enhancing processing methods that are applicable to radiation images have been described in the state of the art.

For example in European patent application 546 600 optimal window/level setting is described. In this patent application the automatic determination of two characteristic histogram points has been described. The lower and the upper boundary of the diagnostically useful signal range, are determined resulting in an appropriate window/level setting.

In European patent application 549 009 a method has been described for deriving a sensitometric mapping from these characteristic histogram points.

In European patent application 527 525 a method known as Multiscale Image Enhancement and Amplification (MUSICA) is disclosed to enhance details independent of their scale or extent so as to optimally map the input dynamic range on the available output dynamic range.

It has been recognized that the effectiveness of these techniques primarily depends on the optimal selection of parameters that are used. These parameters are not fixed, but are selected in function of the image content and the examination type. The techniques for determining the parameters commonly rely on a computation of the histogram of the image.

However, the histogram is often based on data originating from the image in its entirety. More specifically, the histogram takes into account data originating from foreground or collimated areas (even from different images in the case of split screen images), as well as data from direct exposure area (also called background area) in addition to data from diagnostically relevant area.

These background and foreground area may influence the selection of the parameters, which in its turn may give rise to undesired effects.

Techniques have been developed for delineating the exposed area in case of collimated images.

For example, in European patent application 610 605 a technique has been described that that is suitable for the purpose of delineating the exposed area in so-called collimated radiographic images.

In European patent application 742 536 this technique is further elaborated to cope with a multiply exposed image (split screen images), an imaging process known as partitioning.

However, the exposed area delineated by the above methods may still comprise direct exposure area in addition to the diagnostically relevant area. For certain examination types, these direct exposure area represent a relatively large fraction of the total exposed area. The presence of direct exposure areas obstructs the image processing in general and specifically the contrast enhancement.

It is thus required to identify the direct exposure area in a radiation image.

In U. S. Pat. No. 5,268,967 and corresponding EP 0 576 961 a method for automatic foreground and background detection in digital radiographic images is disclosed.

The method involves an edge detection step, a blockwise analysis of a tiled image by calculating edge strength and variance in each block to classify it as either homogeneous, non-homogeneous or mixed type, and a block refinement applied to blocks of mixed type. The method however does not produce a pixel precise delineation of the foreground, since the result of the block refinement may still be coarse and non-straight for collimation regions with straight edges. The method appears to be time consuming since it needs to operate on the full scale image.

U. S. Pat. No. 5,426,684 extends the idea of calculating statistics within each block by also considering a plurality of texture features. Thus, in addition to the one-dimensional feature such as gray level and variance, features derived from a two-dimensional co-occurrence matrix are computed. Each sample block is then classified with a previously trained neural network classifier to determine its class. Pixel values belonging to the same class are accumulated to form separate histograms for each class. Each of the histograms are then used to optimize tone scale reproduction. It is commonly known in texture analysis that the blocks need be sufficiently large to compute a reliable two-dimensional statistic. 39×39 pixel subregions are mentioned to this purpose. Hence, the problem of pixel precise delineation, especially for straight border foreground regions, remains unalleviated.

In U. S. Pat. No. 5,046,118 a tonescale transformation function is determined based on the histogram entropy of the input image. The method computes the background threshold from the histogram by (1) assuming the histogram is bimodal and (2) determining the gray level that separates the two modes by maximizing the a posteriori entropy of the image. However, many images show a multimodal histogram, in which the additional modes appear and either belong to the diagnostic area, due to the presence of substantially large tissue and bone portions in the body region, or belong to the background, which is split by the body region, each part having received a different scatter fraction (mostly extremities examinations). Less frequently, both the diagnostic area and the background show multiple modes.

In U. S. Pat. No. 5,124,913 a rule based technique automatically determines the final scan gain in a storage phosphor radiography system. The rules are based on the peaks detected by a method based on the cumulative histogram.

In U. S. Pat. No. 5,164,993, combined use is made of the histogram, the cumulative histogram and the entropy of subsections of the histogram to create the fine tonescale transformation. Using these three functions, the histogram can be divided into a region of interest, a low-signal foreground region and a high-signal background region. To delineate these histogram intervals, the positions of a so-called left-point (border between foreground and region of interest), right point (border between region of interest and remaining anatomy) and background point (border between remaining anatomy and true direct x-ray background) are determined. However, the method assumes that each of the intervals contains one mode only, which is not always true.

Therefore a method coping with multiple histogram modes is required.

OBJECT OF THE INVENTION

It is an object of the invention to provide a method for segmenting a radiation image into direct exposure areas and diagnostically relevant areas, that does not show the drawbacks of the prior art.

Further objects will become apparent from the description hereafter.

SUMMARY OF THE INVENTION

The objects of the present invention are achieved by a method of segmenting a radiation image represented by a digital signal representation into direct exposure area and diagnostically relevant area, comprising the steps of calculating a histogram of said radiation image, calculating local centroids of said histogram, constructing a set of archetype histograms with associated location and strength of its local centroids and with an associated threshold value, selecting from said set an archetype histogram that corresponds with said calculated histogram on the basis of the correspondence of location and strength of the calculated local centroids with location and strength of the local centroids associated with the archetype histogram, selecting the threshold value associated with a selected archetype histogram, applying said threshold value to the radiation image so as to form a bitmap image comprising a different label for pixels of (a) direct exposure area and for pixels of (a) diagnostically relevant area respectively.

The above method may additionally comprise a step of determining processing parameters on the basis of the diagnostically relevant area only and/or a step of applying image processing or image analysis to the diagnostically relevant area only.

The method can be applied to either a non-collimated image, a single collimated image or a multiply exposed image obtained by partitioning (split screen exposure).

The digital signal representation of the radiation image may be acquired by a wide variety of image acquisition devices.

Examples such image acquisition systems are a system for reading an image that has been stored in a photostimulable phosphor screen, a film scanning system or a direct digital image acquisition system such as a computed radiography system etc.

BRIEF DESCRIPTION OF THE DRAWINGS

Further details of the present invention as well as preferred embodiment hereof will be explained hereafter with reference to the drawings in which.

DETAILED DESCRIPTION

Basic Considerations

Central to the invention disclosed is the modeling of the background in order to determine an appropriate threshold to segment it from foreground and body parts (diagnostically relevant area). Since the background in the image represents an unattenuated part of the x-ray beam in the field of view of the detector, its statistics can be derived from the physics of image formation and the signal transformations in the digitization stage.

It is commonly known that the x-ray source emits a discrete number of photons per unit time. The quantization of the energy into photons is the source of quantum noise, which is Poisson distributed. The Poisson law results from computing the probability that K photons are emitted and detected without attenuation in an interval T, the time interval of the exposure.

Prior art such as described in H. Barrett and W. Swindell, "Radiological Imaging, the theory of image formation, detection and processing", Vol. 1 and 2, Academic Press, 1981, derives the governing equations of the processes involved. Assuming that the average number of photons emitted in a time interval T is aT, the mean and the variance of the random variable K is $\overline{K}=aT$ resp. $\sigma_K^2=\overline{K}$.

This is the main distinguishing feature of Poisson random variables that the variance always equals the mean. This property further implies that the noise is signal-dependent. In order to make the noise constant and signal-independent, a square root transform may be applied to the signal before A/D conversion such as disclosed in European patent application 574 969.

Denoting the exposure image by E and the raw image by g and the ensemble of system gains by a, the following transform relates the exposure image (or associated dose image) to measured raw intensities $$g = \sqrt{aE}$$

The variance of the square root transformed exposure is, under the assumption of Poisson noise (or alternatively stated, quantum limited detector response), independent of the mean value of E and equal to ¼ if a=1.

The practical result is that—under the assumption of quantum limited detector response—the noise may be assumed stationary and Gaussian distributed. Therefore, it may be expected that background areas will manifest themselves in the gray value histogram h(g) as a Gaussian lobe at the higher intensity end, with area dependent on the unattenuated portion of the imaged x-ray beam.

Brief Outline of the Steps of the Algorithm

Figure 1:
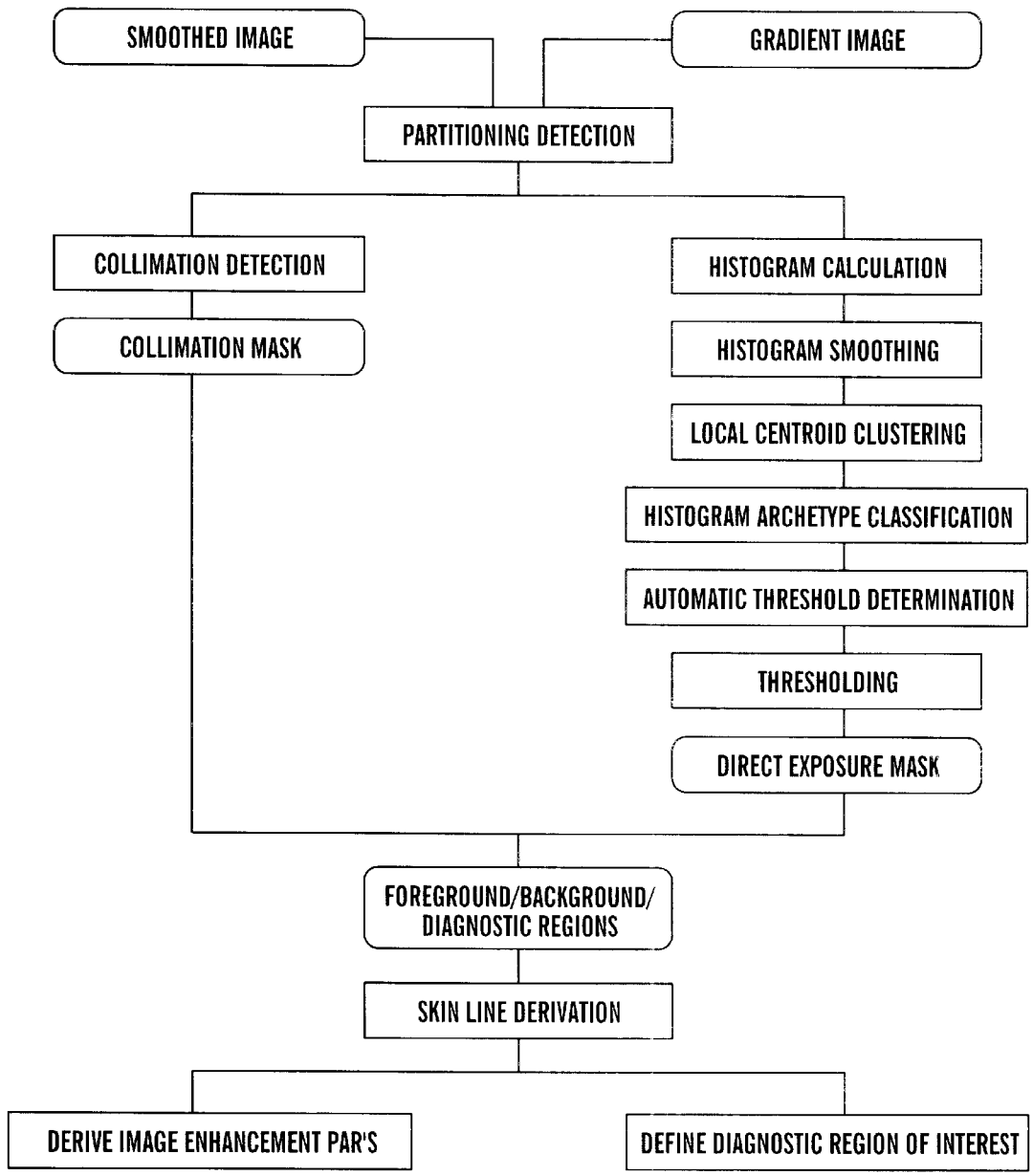
FIG. 1 is the flowchart illustrating the method of the present invention.

The different steps of the method of the present invention are depicted in FIG. 1 and comprise:

1. Submitting the digital image to a partitioning detecting method and partitioning boundary determination method such as disclosed in European patent application 742 536.
2. Submitting each of the detected subregions to a collimation detecting method and collimation mask determination method such as disclosed in European patent application 610 605.
3. Calculating the histogram of each of the subregions.
4. Calculating the smoothed histogram of each histogram by applying a smoothing operator to the histogram
5. Calculating the local centroids of the smoothed histogram
6. Classifying the histogram on the basis of location and strength of the centroids in one out of a set of archetype histograms Determining a threshold to separate background from diagnostic and collimation zones in the histogram on the basis of applicable archetype and characteristic histogram points 8. Applying the threshold to the digital image to form a bitmap image comprising a label for each of the foreground (or collimated), background (or direct exposure) and diagnostic (or body part) regions
9. Calculating the histogram of the pixels of the diagnostic image parts only
10. Applying the image enhancement such as disclosed in EP 546 600, EP 549 009 and EP 527 525 on the basis of the histogram of the diagnostic image parts only.

Steps 1 and 2 are optional and need not to be performed in case of a non-partitioned and/or non-collimated image. In these cases, step 3 is performed on the entire image. Step 4 is also optional.

The following is a detailed description of an embodiment of steps 4–8.

Steps 9 and 10 relate to post-processing of the results of the method of the present invention.

Calculating the Histogram and the Smoothed Histogram

A first operation in constructing the histogram is to rebin the original gray values so that the histogram shows sufficiently continuous non-zero entries. More particularly, a rebinning from 12 bit to 8 bit gray values is executed.

The method of obtaining the histogram is one of the most basic image processing operations. However, in view of the subsequent automatic centroid location, the operation can be refined in that pixels having high gradient value are not considered in constructing the histogram. The effect is a more sharp distinction between the different modes present, since pixels on transition from one region to another have gray values lying in between those of the corresponding mean gray value of the regions.

A second refinement to achieve better centroid differentiation is image blurring, since averaging reduces the standard deviation of a distribution. These operations form prior art and are described e. g. in A. Rosenfeld and A. Kak, Digital Picture Processing, 2nd ed., Academic Press, Chapter 10.1.2. Gray Level Thresholding.

Lastly, in order to achieve robustness of the subsequent operations and accuracy of the derived parameters, the original histogram h(g) may be smoothed with a kernel of typically 5 gray value bins to obtain $\bar{h}(g)$. Its effect is to reduce the noisy appearance of the histogram and reduce the influence of spurious secondary maxima.

Calculating the Centroids of the Histogram or Smoothed Histogram

The centroids of a histogram correspond to the mass centers of its main lobes.

They can be derived by an iterative algorithm based on the idea that at each point in the histogram, the probability mass should be moved to the local centroid defined within some window. The algorithm is known in the prior art and disclosed in e. g. R. Wilson and M. Spann, "Finite prolate spheroidal sequences and their applications II: Image feature description and segmentation", IEEE Trans. on Pattern Analysis and Machine Intelligence, Vol. 10, no. 2, March 1988, p 199, and in R. Wilson, "A class of local centroid algorithms for classification and quantization in spaces of arbitrary dimension", Proc. IEEE CSSP, Bangalore, India, 1984.

The adaptation of this technique to the one dimensional case of gray value histograms is briefly described as follows.

(1) Calculate the true range ($l_g$, $r_g$) of the histogram h(g) in which $l_g$ and $r_g$ are fixed percentiles from the cumulative histogram $h_c(g)$. L further denotes the number of gray level bins in the histogram.

(2) Calculate the size of a range dependent window w such that the maximum number of centroids found will not exceed a predetermined number $$w = w_{fr} \frac{(r_g - l_g)}{L}$$

In the context of the present invention, $w_{fr}$ typically is 31 gray value bins for a histogram rebinned to L=256 levels.

(3) Initialize by setting the requantized histogram resp. class assignment to $h_0(g) = h(g)$ $i_0(g) = g$.

The local centroid algorithm consists of iterating steps (4), (5) and (6), described for the n-th iteration:

(4) At each gray level g, $0 \leq g < L$, for which h(g)>0, calculate the local centroid c(g) on a window with width w $$c(g) = \frac{\sum_{g' \in S_w} g' h_n(g')}{\sum_{g' \in S_w} h_n(g')} \quad \text{with} \quad S_w = \{g' : \|g' - g\| \le w\}$$

(5) Update the classification $i_n$ of the gray value g $$i_n(g) = C(i_{n-1}(g))$$

(6) Calculate a new histogram $$h_{n+1}(g) = \sum_{g' \in I_g} h_n(g')$$

where $$I_g = \{g' : i_n(g') = g\}$$

The algorithm for the given window width w terminates when $h_{n+1}(g) = h_n(g)$ for all g, with a final class assignment $i_n(g)$ (7) Gray value and mass of the centroid are represented by the tuples $(g, h_n(g))$ of the non-zero entries in $h_n(g)$.

The centroids are further labeled as either strong or weak on the basis of an empirically determined level. This level represents the fraction of the histogram associated with the centroid and equals 8%. The region of support of the centroid is defined as the gray value interval covered by the centroid, that is, all gray values of the interval of a centroid are concentrated into the centroid. These intervals $I_n$ are easily determined as the groups of gray values having received equal class assignment $i_n(g)$.

Figure 2:
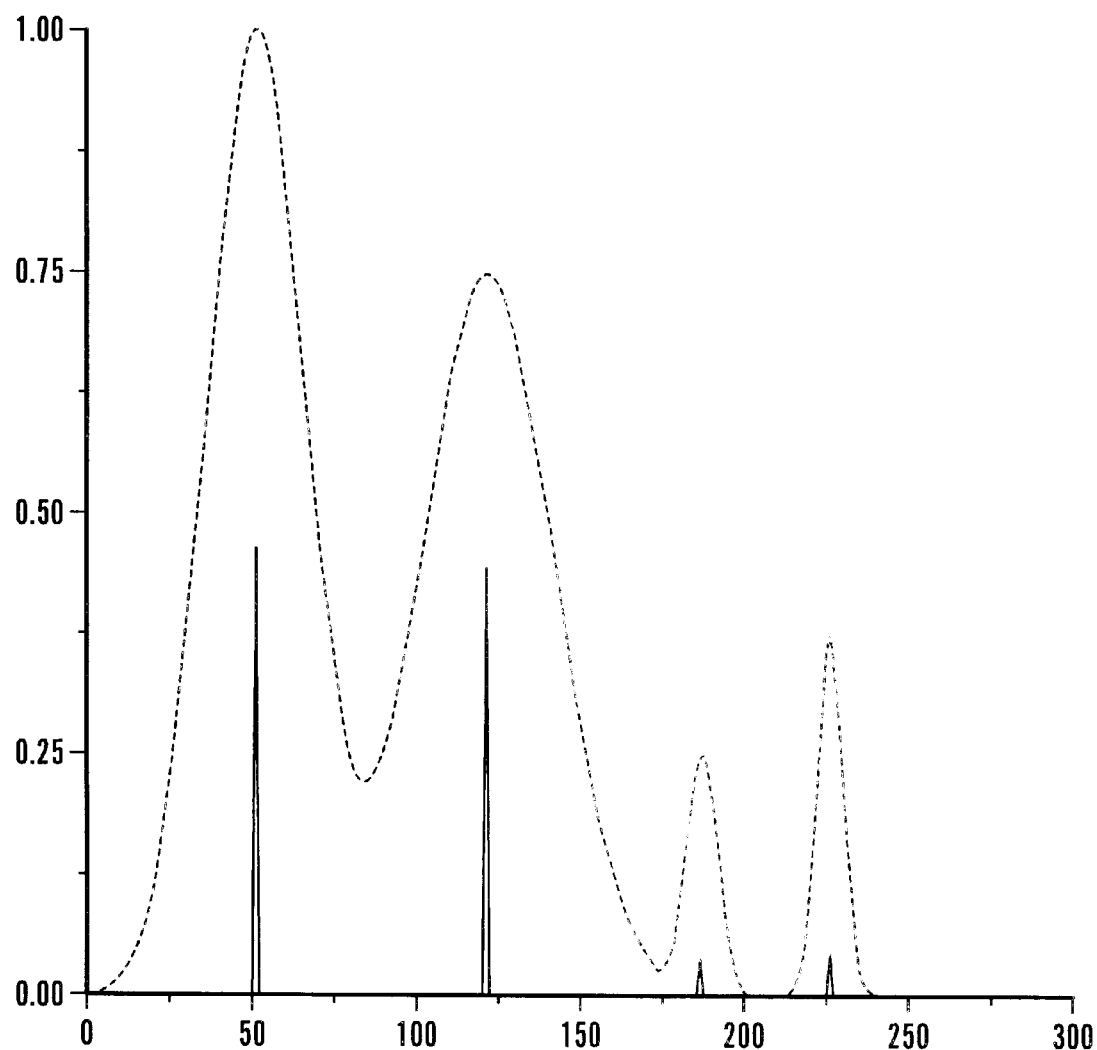
FIG. 2 is a histogram with 4 Gaussian lobes, each of which is represented by one centroid.

FIG. 2 gives an example of a histogram consisting of 4 superimposed Gaussian distributions with different mean, standard deviation and amplitude and the automatic detection of the corresponding centroids by the centroid clustering algorithm. The height of the centroid impulses is proportional to the area of the associated histogram lobe.

Deriving a Threshold on the Basis of a Histogram Centroid

Given a Gaussian shaped histogram lobe, a threshold can be derived as a function of the standard deviation without actually fitting a normal distribution to the data. However, the assumption of an underlying Gaussian is not always true. Even when the distribution is non-Gaussian, the algorithm disclosed still delivers a meaningful threshold.

Figure 3:
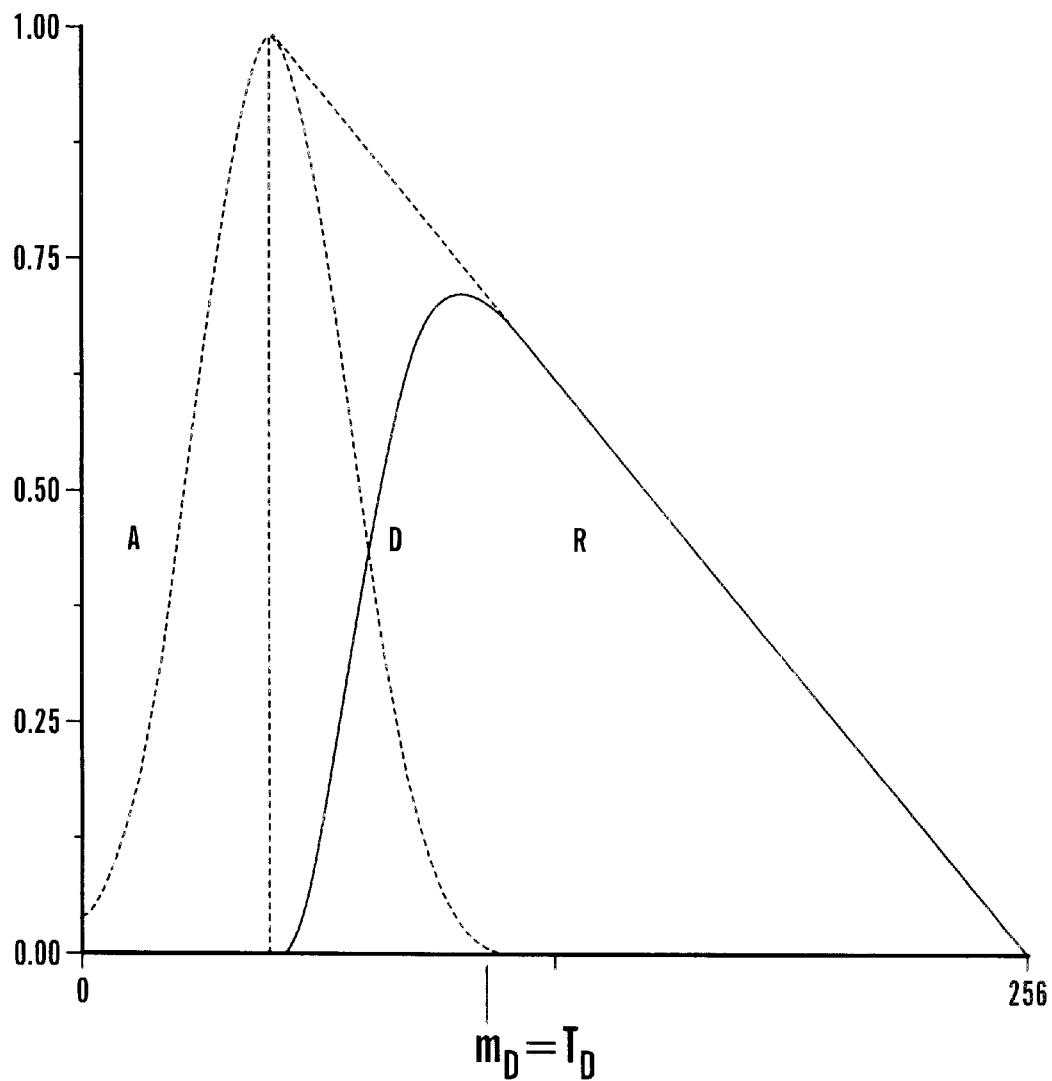
FIG. 3 is a histogram by means of which the oblique line mechanism used to derive a threshold is illustrated.

FIG. 3 illustrates the operation. The basic feature of the method is to locate the threshold at the basis of the lobe A, by finding the position $m_D$ of the maximum of the difference profile D, obtained by subtracting the lobe A from an oblique line R constructed between the maximum $(m_A, h(m_A))$ of the lobe and the fixed start point (0, 0) or end point (L-1,0) of the histogram range.

Finding the maximum as a function of the standard deviation for the Gaussian distribution assumption involves solving a non-linear equation numerically. For both the Gaussian and non-Gaussian case however, the maximum can be easily located numerically from the difference profile by taking the location of the maximum value. For large modes in the histogram, due to pixels from diagnostic regions, the threshold determined by this scheme is referred to as $T_D$.

Deriving a Threshold on the Basis of the Background Noise Interval

Figure 4:
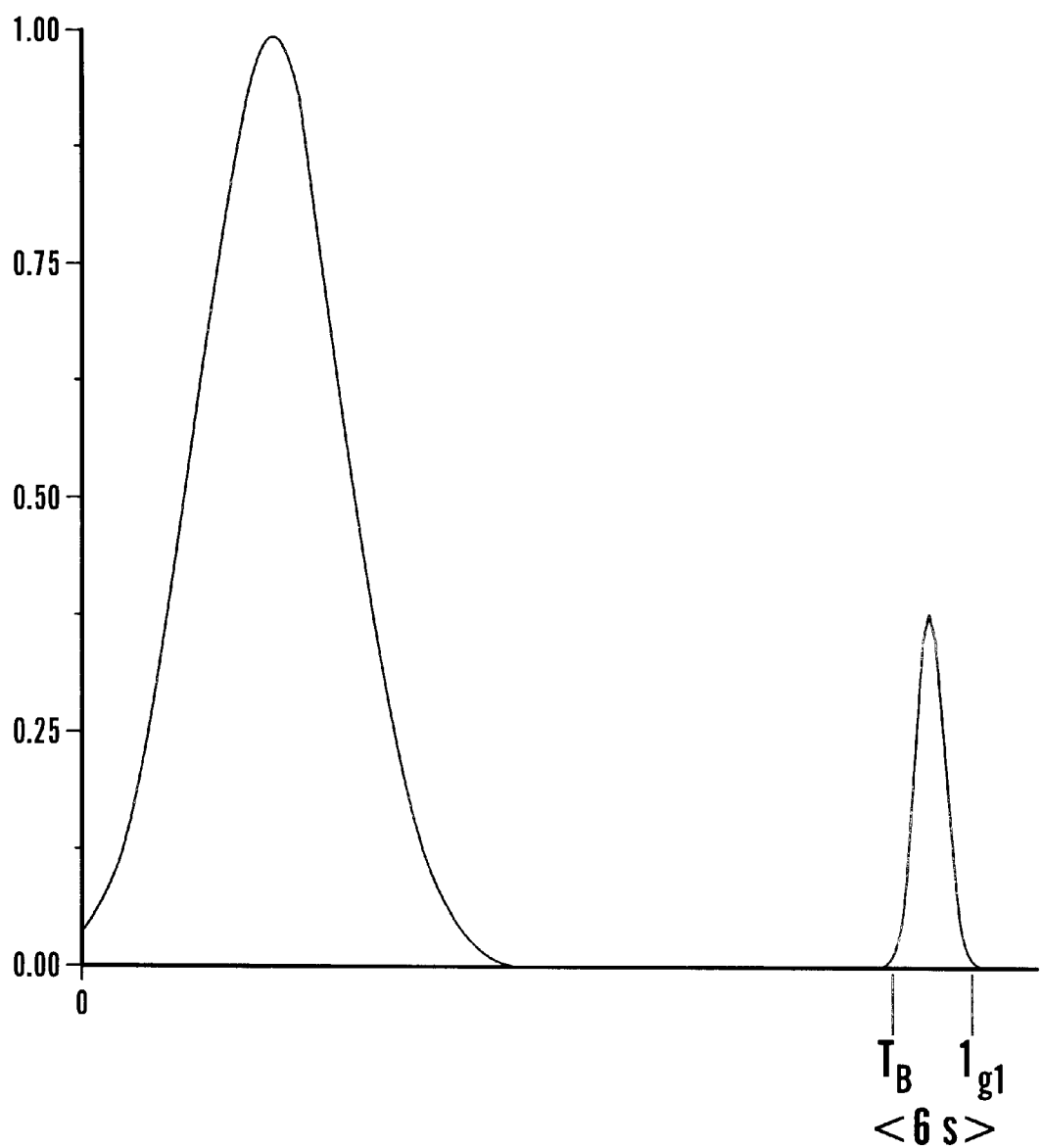
FIG. 4 is a histogram by means of which the fixed noise interval method used to derive a threshold is illustrated.

With reference to the basic considerations on noise transformations, a prediction can be made as to the gray value interval pertaining to background regions in the image. This interval is depicted in FIG. 4 and can be derived from the most exposed gray value $l_{g1}$ present in the image and the noise standard deviation σ as $$T_{B-l_{g1}} - k\sigma$$

in which k=6, that is more than 99% of the Gaussian distribution according to noise in the background is captured in the interval $[T_B, l_{g1}]$.

Conservative Nature of Threshold Determination

Figure 5:
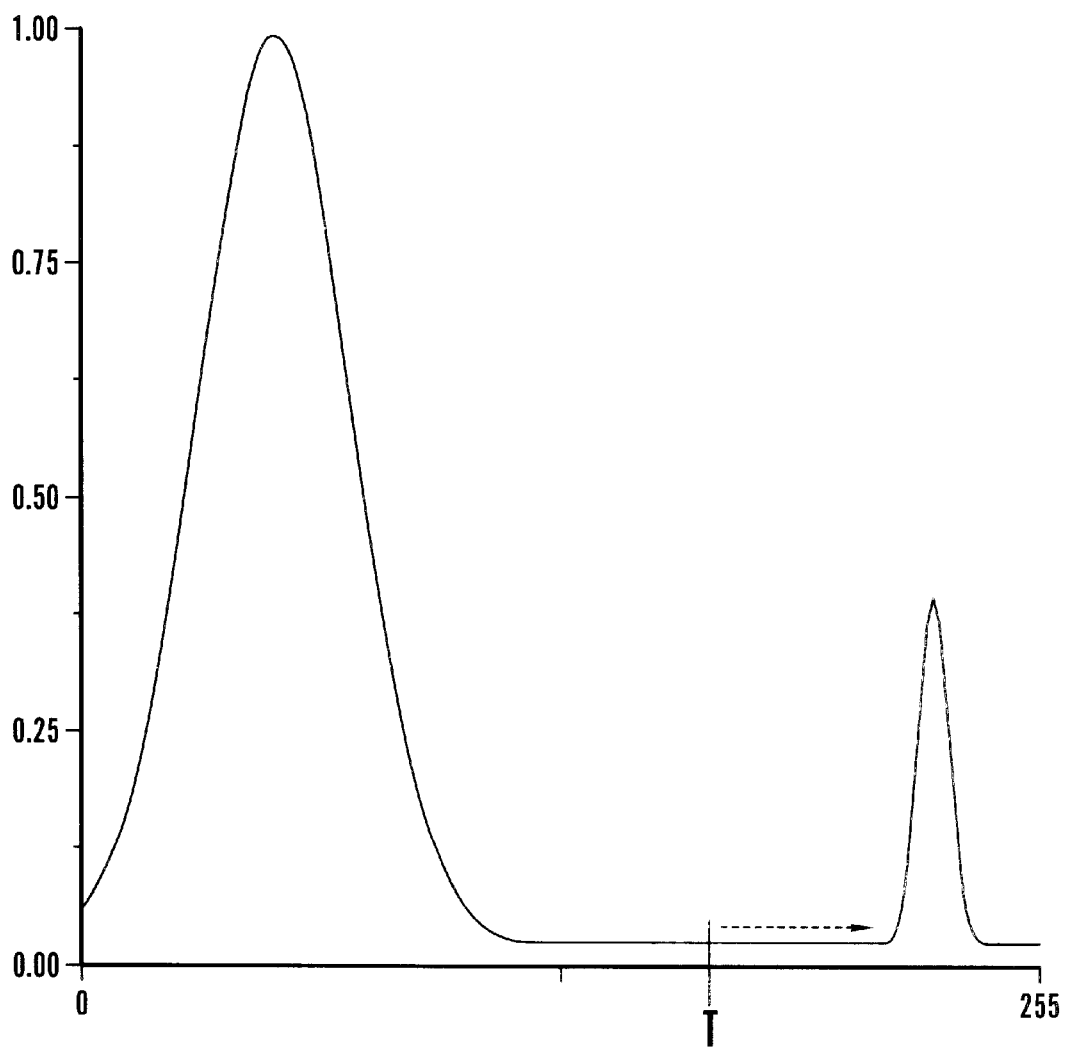
FIG. 5 is a histogram by means of which the conservative threshold determination by shifting the threshold to the rightmost point in its associated histogram valley is illustrated.

In order not to obscure any diagnostic parts, the threshold determination algorithm for all classes is conservative in that it will put the threshold always in favor of the diagnostic regions, or which is equivalent, towards the more exposed position in the histogram. This is achieved by shifting the threshold to the more exposed side in the histogram until a value determined from the histogram value prior to the shift operation is exceeded. Stated in other words, the threshold is shifted towards the more exposed side of the associated histogram valley. The operation is illustrated by FIG. 5. The effect on the bitmap thresholded result is that pixels belonging to the body outline and having transient gray values are classified as diagnostic pixels.

Summary of Characteristic Points of the Histogram

Figure 6:
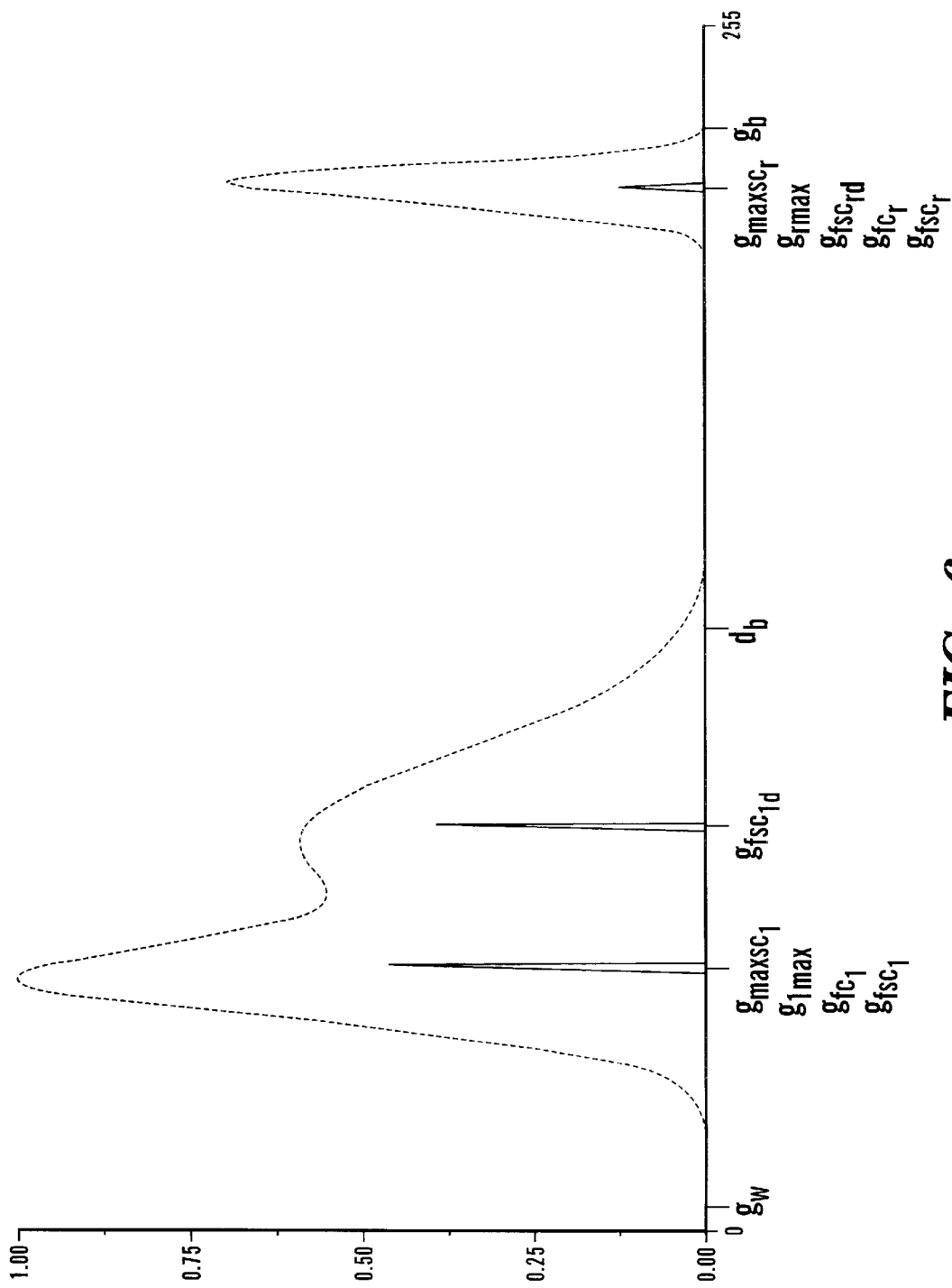
FIG. 6 is a histogram with 2 diagnostic modes and 2 background modes, characteristic points being indicated.

With reference to histogram depicted in FIG. 6, the following characteristic points are defined decision boundary $d_b$: this boundary is an empirically determined gray value used to determine further characteristic points. It divides the gray value range of the histogram at hand into 2 parts according to predetermined fractions given by the expression $$d_b = \frac{w_w \cdot g_w + w_b \cdot g_b}{w_w + w_b}$$

In the present example, $W_w=2$ and $W_b=3$, these values were determined empirically by studying a mixture of 2000 examinations. In the sequel, the more exposed histogram gray value entries are associated with the right side of $d_b$, the less exposed with the left side of $d_b$.

the largest strong centroid $(g_{maxsc_l}, h_n(g_{maxsc_l}))$ and $(g_{maxsc_r}, h_n(g_{maxsc_r}))$ at the left resp. the right side of $d_b$. The larger of $(g_{maxsc_l}, h_n(g_{maxsc_l}))$ and $(g_{maxsc_r}, h_n(g_{maxsc_r}))$ indicates whether the diagnostic regions or the directly exposed regions dominate the histogram.

the maximum $(g_{lmax}, h(g_{lmax}))$ and $(g_{rmax}, h(g_{rmax}))$ of the histogram h(g) at the left resp. the right side of $d_b$. They also express an indication of the most dominant region in the image.

the maximum $(g_{lmax}, \bar{h}(g_{lmax}))$ and $(g_{rmax}, \bar{h}(g_{rmax}))$ of the smoothed histogram $\bar{h}(g)$ at the left resp. the right side of $d_b$. Similarly, they form an indication of the most dominant region in the image, but are less prone to the presence of maxima having small support.

the first strong centroid $(g_{fsc_{ld}}, h_n(g_{fsc_{ld}}))$ and $(g_{fsc_{rd}}, h_n(g_{fsc_{rd}}))$ at the left resp. the right side of $d_b$. They are indicators of the—possibly borderline—gray values still pertaining to the diagnostic resp. the direct exposure regions.

the gray values $g_w$ and $g_b$ define the overall gray value range in the image the first centroid $(g_{fc_l}, h_n(g_{fc_l}))$ and $(g_{fc_r}, h_n(g_{fc_r}))$ at the right of $g_w$ resp. the left of $g_b$ define a more meaningful gray value range by leaving small distribution outliers out of consideration the first strong centroid ($g_{fsc_l}, h_n(g_{fsc_l})$) and ($g_{fsc_r}, h_n(g_{fsc_r})$) at the right of $g_w$ resp. the left of $g_b$ define also a more meaningful indicator of gray value range by further omitting centroids representing small area regions in the image.

Histogram Archetypes

According to different examination types, the histogram can be classified as one out of a set of archetype histograms on the basis of criteria computed from the centroids of the histogram. The archetypes are illustrated with real histograms.

Figure 7:
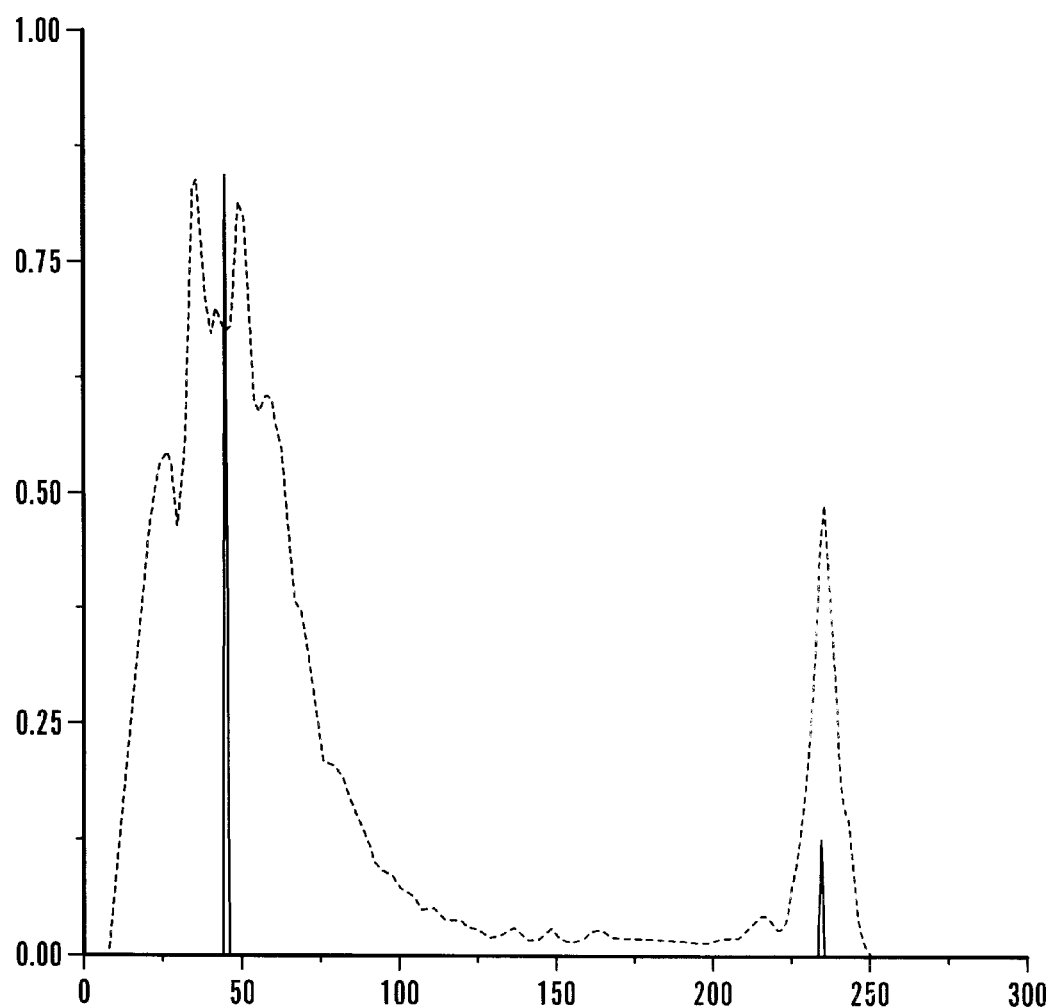
FIG. 7 is an example of a standard bimodal smoothed histogram with centroids detected for each mode or distribution.

1. The multimodal case of one or more large diagnostic lobes and a sufficiently large background mode (FIG. 7). The diagnostic lobes are clustered by the centroid clustering algorithm as one or more associated centroids and the background peak is represented by one centroid. The properties evaluated are range sufficiently large, by checking both $$\frac{g_{fc_r} - g_{fc_l}}{L} > T_c \quad \text{and} \quad \frac{g_{fsc_r} - g_{fsc_l}}{L} > T_{sc}$$

the diagnostic lobes dominate the histogram, by checking $$\overline{h}(g_{lmax}) > \overline{h}(g_{rmax})$$

In the present embodiment, $T_c = \frac{1}{3}$ and $T_{sc} = \frac{1}{4}$.

This type represents the standard case of an image with both large diagnostic regions and large background regions and covers most examination types such as thorax, skull, pelvis . . . . The final gray value threshold is determined as $$T = \frac{T_B + T_D}{2}$$

and is finally moved towards the more exposed position in its associated histogram valley.

2. The case in which the background region is dominant, expressed by the conditions
range sufficiently large, by checking both $$\frac{g_{fc_r} - g_{fc_l}}{L} > T_c \quad \text{and} \quad \frac{g_{fsc_r} - g_{fsc_l}}{L} > T_{sc}$$

the background lobe(s) dominate(s) the histogram, by checking $$\overline{h}(g_{lmax}) > \overline{h}(g_{rmax})$$

This case represents images with large background regions, such as extremities. To determine the gray value threshold, the following subcases are considered, depending on the presence or absence of strong centroids at the left of the decision boundary $d_b$ 2.a. There exists a strong centroid ($g_{fsc_{ld}}, h_n(g_{fsc_{ld}})$) at the left of $d_b$ and a strong centroid($g_{fsc_{rd}}, h_n(g_{fsc_{rd}})$) at the right of $d_b$.

Figure 8:
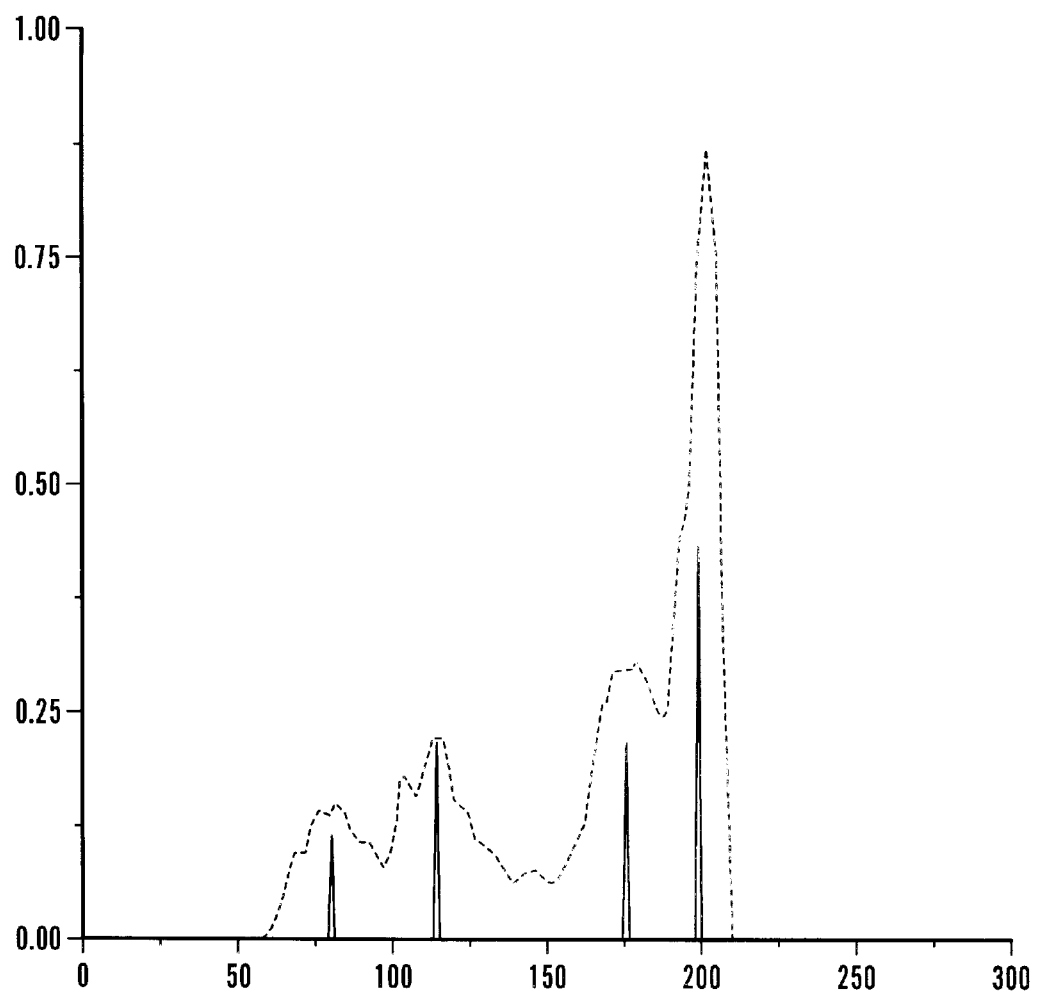
FIG. 8 is an example of a smoothed histogram with dominating background lobes (2 rightmost centroids) from an extremities examination.

Hence, there exists a clear valley in the interval [$g_{fsc_{ld}}$, $g_{fsc_{rd}}$], of which the location T is determined by searching for the minimum in the interval. A real example of this archetype histogram is given in FIG. 8.

Figure 9:
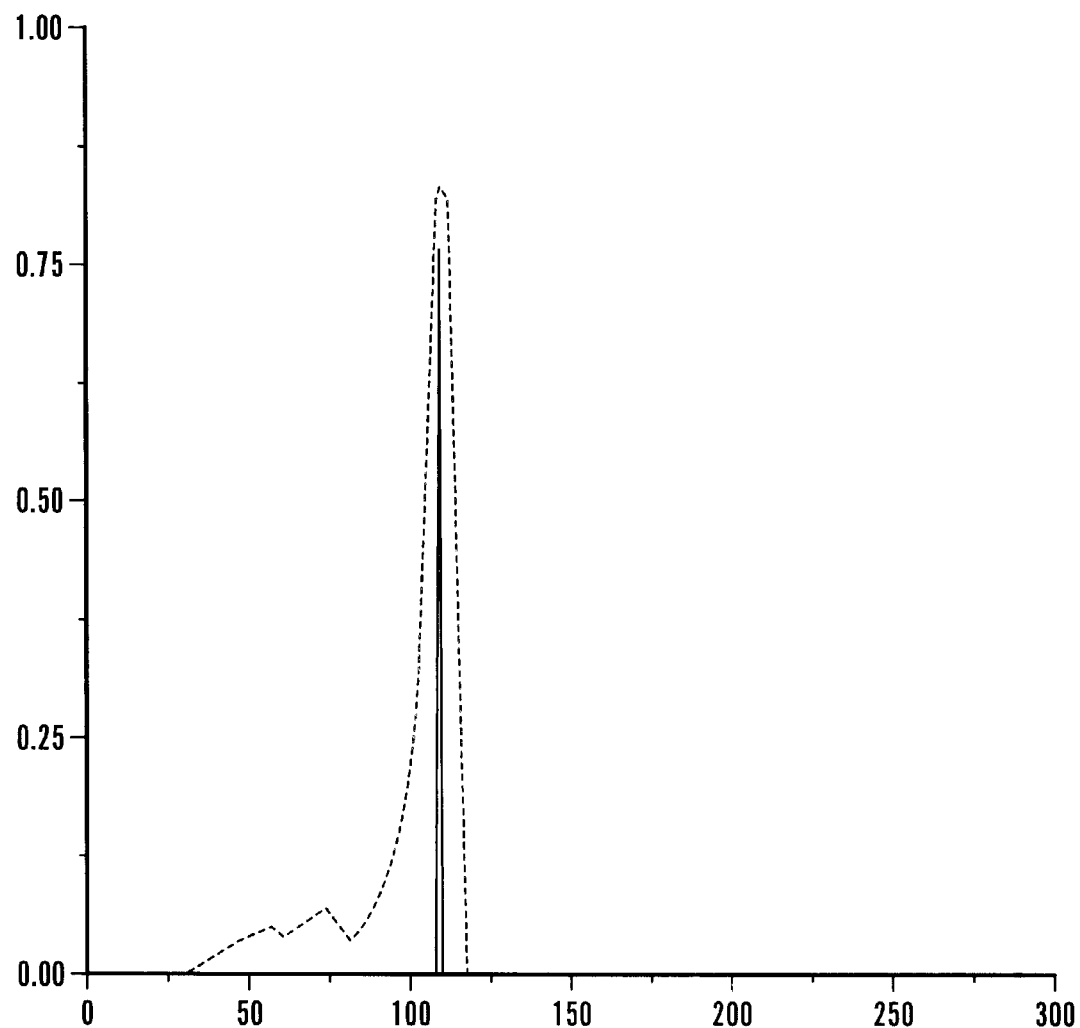
FIG. 9 is an example of a smoothed histogram with no strong diagnostic centroids and one strong background centroid. The threshold is determined by the oblique line mechanism being applied to the left of the rightmost distribution.

2.b. There does only exist a strong centroid ($g_{fsc_{rd}}, h_n(g_{fsc_{rd}})$) at the right of $d_b$. Thus a minimum locator cannot be used to determine T reliably. However, since the background is dominating strongly, the oblique line mechanism can be used to determine the threshold T on the left side of the background distribution. An example is given in FIG. 9.

In both cases 2.a. and 2.b. the operation is completed by right shifting the threshold in its associated valley so as to fully preserve diagnostic information.

3. The case in which the range is not sufficiently large. This case arises when background regions are absent due to all irrelevant areas being masked off by collimation material. Hence, the diagnostic gray value range is lying closely to the gray value distribution associated with the collimation regions. The conditions for this case are:
range not sufficiently large, by checking $$\frac{g_{fc_r} - g_{fc_l}}{L} < T_c$$

the lobe associated with the collimation areas dominates the histogram $$\overline{h}(g_{lmax}) < \overline{h}(g_{rmax})$$

in the presence of a strong centroid at the right of $d_b$, the range criterion is further extended with $$\frac{g_{fsc_r} - g_{fsc_l}}{L} < T_{sc}$$

alternatively, in the presence of a weak centroid at the right of $d_b$, the associated maximum is also weak, and can thus be safely omitted from consideration as a background mode whenever $$\frac{\overline{h}(g_{rmax})}{\overline{h}(g_{rmin})} < R$$

In the present embodiment of the invention, R =5.0. On fulfillment of these conditions, it is concluded that no background regions are present, and the threshold is made to coincide with the largest exposed gray value:

$$T = g_b.$$

Figure 10:
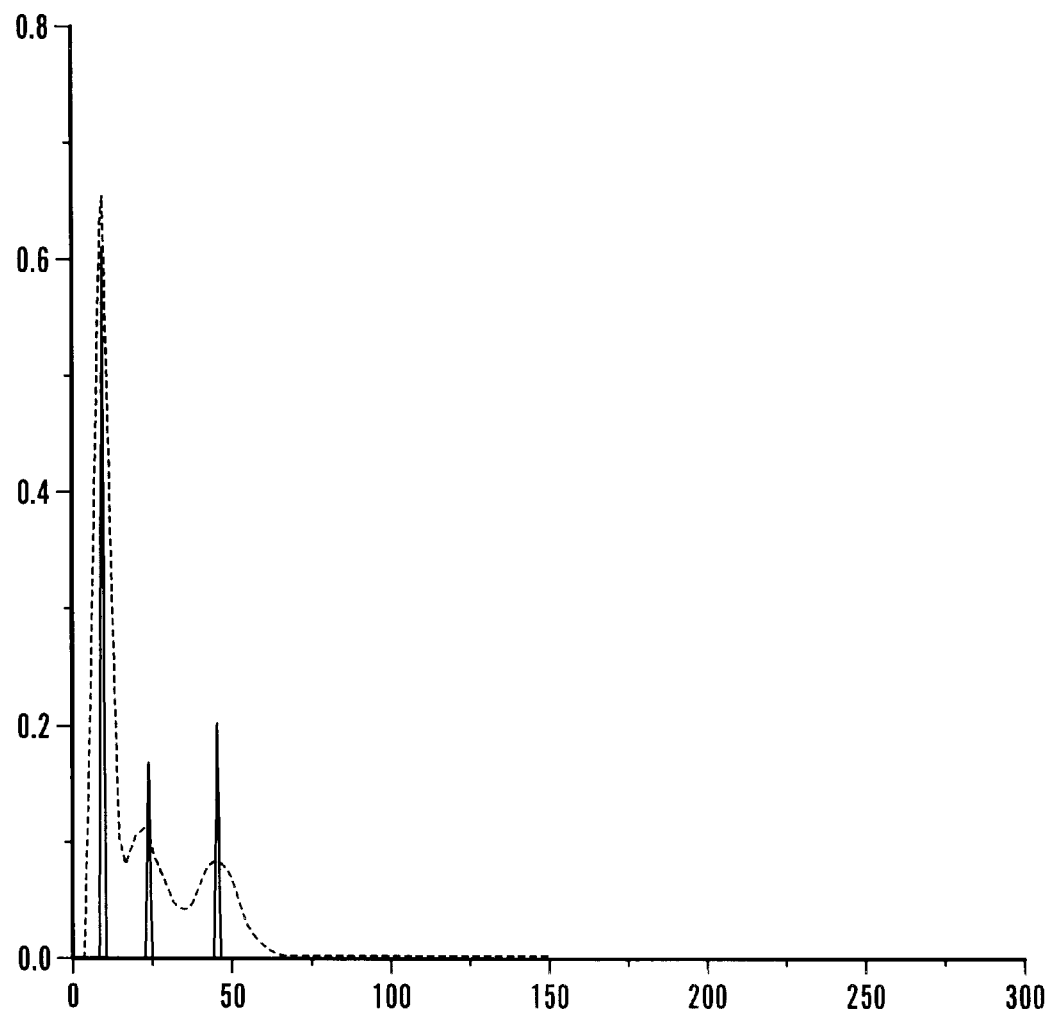
FIG. 10 is an example of a smoothed histogram with small range. No background lobes are present, hence no thresholding is performed by letting the threshold coincide with the rightmost non-zero entry in the histogram.

Representative examination types include strongly collimated exposures such as spinal column, of which a real histogram and associated centroids is given in FIG. 10.

Constructing a Bitmap Mask

The threshold determination is followed by application to the proper sub-image. The whole procedure from histogram calculation through threshold determination is repeated for each sub-image in turn. A combined bitmap mask image is formed by assigning a different pixel label to collimation regions (foreground), direct exposure regions (background) and diagnostic regions (body parts).

Finding the Skin Line of a Diagnostic Region

Given the bitmap result after thresholding the image, the outline of the body can be established by finding the contour between direct exposure regions and diagnostic regions. Contour or part of contours between collimation material and direct exposure, or between collimation and diagnostic regions are disregarded. Finding the contour is necessary to establish the diagnostic region of interest (ROI) for subsequent processing, such as image enhancement and image analysis. Particularly in the domain of digital mammography, such ROI is of clinical importance.

Figure 11:
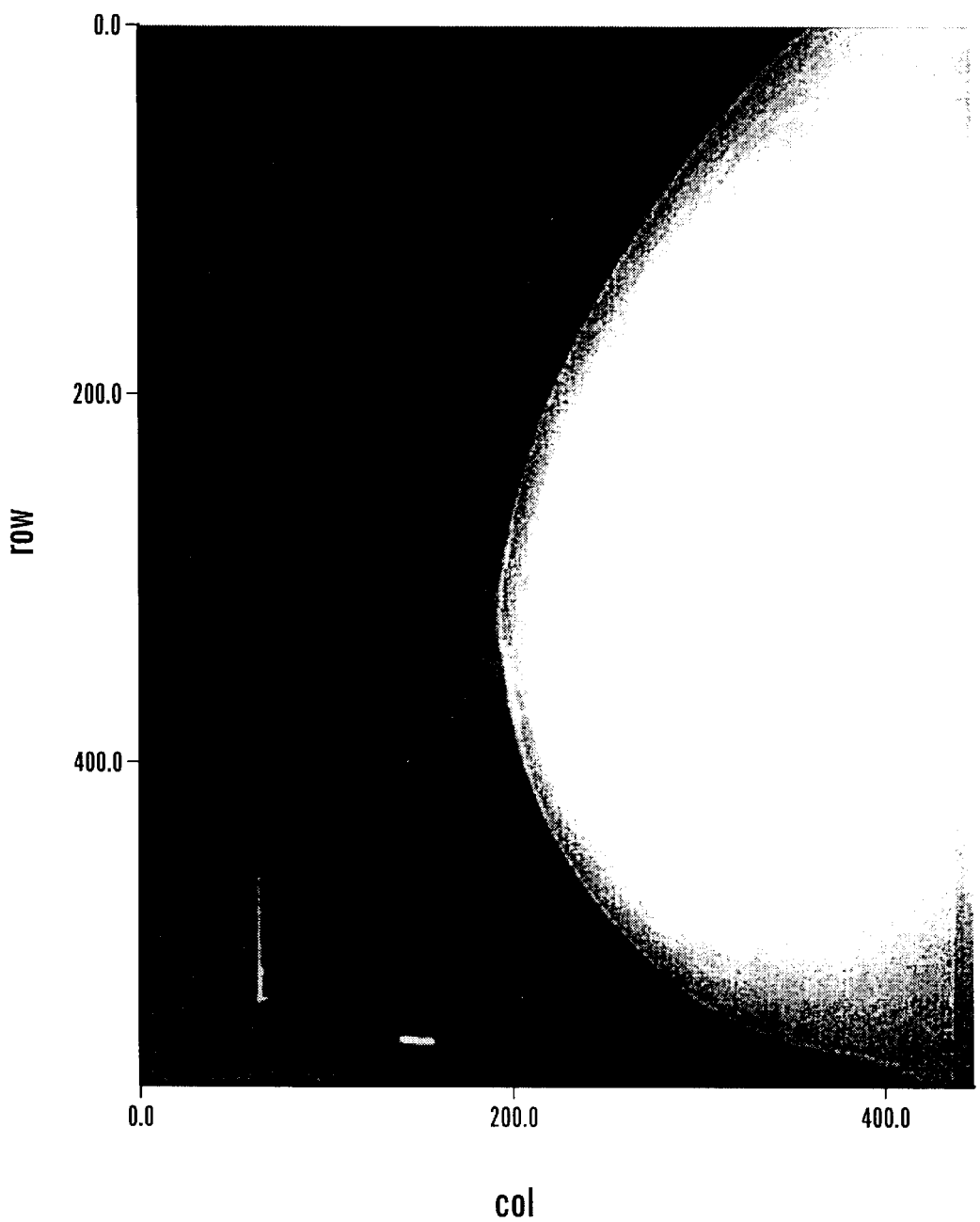
FIG. 11 is an image of a mammogram.
Figure 12:
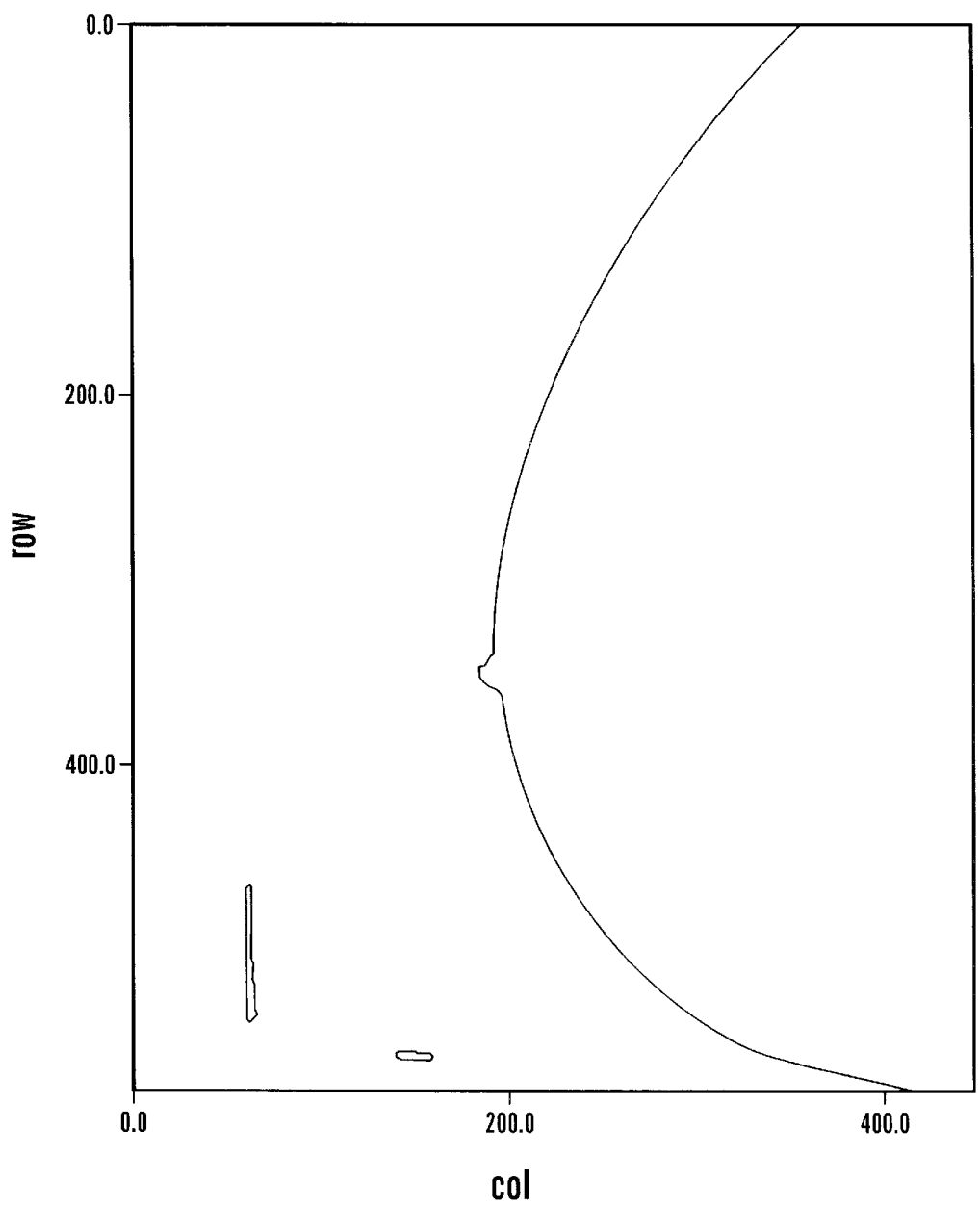
FIG. 12 is the automatically computed skin line of the mammogram of FIG. 11.

An example of a digital mammogram and its associated skin line is depicted in FIG. 11 resp. FIG. 12. The skin line is derived by detecting the border pixels between the regions formed by pixels with 'direct exposure' and 'diagnostic label'. Whenever a pixel with 'direct exposure' label is touching a pixel labeled 'diagnostic' and such in a 4 connected way, it is marked as a 'skin line' pixel. The 4-connectedness neighborhood property ensures that the contour formed by running through 'skin line' pixels is 8-connected.

Steering Collimation Algorithm

It is evident that direct exposure area cannot be situated within an area that has been covered by collimation material. The results of the method of the present invention can thus be used to check the result of the algorithm used to detect the collimated zones in an image.

What is claimed is:

1. A method of segmenting a radiation image represented by a digital signal representation into direct exposure area and diagnostically relevant area, comprising the steps of:

calculating a histogram of said radiation image, calculating local centroids of said histogram, constructing independently of the image to be segmented a set of archetype histograms with associated location and strength of its local centroids and with an associated threshold value, selecting from said set of archetype histograms an archetype histogram to correspond with said calculated histogram on the basis of the correspondence of location and strength of the calculated local centroids with location and strength of the local centroids associated with the archetype histogram, selecting the threshold value associated with the selected archetype histogram, applying said threshold value to the radiation image so as to form a bitmap image comprising a different label for pixels of a direct exposure area and for pixels of diagnostically relevant area.

2. A method according to claim 1 additionally comprising a step of determining image processing parameters on the basis of said diagnostically relevant area only.

3. A method according to claim 1 additionally comprising a step of applying image processing to the diagnostically relevant area only.

4. A method according to claim 1 additionally comprising a step of applying image analysis on the diagnostically relevant area only.

5. A method according to claim 1 wherein said threshold value is determined by applying an oblique line procedure comprising:

constructing an oblique line between a maximum of a histogram lobe and a fixed point of a histogram range; and subtracting said histogram lobe from said oblique line.

6. A method according to claim 1 wherein said threshold $T_B$ is determined on the basis of a most exposed gray value $l_{g1}$ present in the image and the noise standard deviation $\sigma$ as $$T_B = l_{g1} - k\sigma,$$

wherein k is an adjustable parameter.

7. A method according to claim 6 wherein k is equal to 6.

8. A method according to claim 5 wherein said threshold is shifted in the direction of most exposed abscissa values so as to conserve a maximum diagnostic region.

9. A method according to claim 6 wherein said threshold is shifted in the direction of most exposed abscissa values so as to conserve a maximum diagnostic region.

10. A method according to claim 1 wherein said set of archetype histogram is constructed on the basis of characteristic points of histograms.

11. A method according to claim 1, additionally comprising a step of determining a contour of diagnostically relevant area by inter-connecting border pixels having a label indicative of diagnostically relevant area.

12. A method according to claim 1 additionally comprising a step of determining a contour of direct exposure area by inter-connecting border pixels having a label indicative of a direct exposure area.

* * * * *